(12) United States Patent
Barrick

(10) Patent No.: US 6,590,523 B2
(45) Date of Patent: Jul. 8, 2003

(54) SYNTHESIS OF TOTAL SURFACE CURRENT VECTOR MAPS BY FITTING NORMAL MODES TO SINGLE-SITE HF RADAR DATA

(75) Inventor: Donald E. Barrick, Redwood City, CA (US)

(73) Assignee: Codar Ocean Sensors, Ltd., Los Altos, CA (US)

( * ) Notice: Subject to any disclaimer, the term of this patent is extended or adjusted under 35 U.S.C. 154(b) by 0 days.

(21) Appl. No.: 10/113,881

(22) Filed: Apr. 1, 2002

(65) Prior Publication Data

US 2003/0038744 A1 Feb. 27, 2003

Related U.S. Application Data

(60) Provisional application No. 60/315,567, filed on Aug. 28, 2001, and provisional application No. 60/308,235, filed on Jul. 26, 2001.

(51) Int. Cl.[7] ............................................. G01S 13/89
(52) U.S. Cl. ........................ 342/191; 342/26; 342/195
(58) Field of Search ........................... 342/26, 191, 195

(56) References Cited

U.S. PATENT DOCUMENTS

| | | | |
|---|---|---|---|
| 3,882,506 A | 5/1975 | Mori et al. ................. 343/728 |
| 4,172,255 A | * 10/1979 | Barrick et al. ............... 342/26 |
| 4,433,336 A | 2/1984 | Carr .......................... 343/728 |
| 4,996,533 A | 2/1991 | May et al. ................... 342/108 |
| H910 H | * 4/1991 | Hindenach .................... 342/25 |
| 5,023,618 A | 6/1991 | Reits ......................... 342/128 |
| 5,252,980 A | 10/1993 | Gray et al. ................... 342/59 |
| 5,361,072 A | 11/1994 | Barrick et al. .............. 342/133 |
| 5,534,868 A | 7/1996 | Gjessing et al. ............... 342/26 |
| 5,990,834 A | 11/1999 | Barrick et al. .............. 342/418 |
| 6,137,433 A | 10/2000 | Zavorotny et al. ............ 342/26 |
| 6,232,922 B1 | 5/2001 | McIntosh .................... 342/453 |

OTHER PUBLICATIONS

Barrick and Evans, "Impementation of coastal current–mapping HF radar system," *Progress Report No. 1, NOAA Tech Reprot ERL 373–WPL 47,* 1976.

Barrick and Lipa, "Evolution of bearing determination in HF current mapping radars," *Oceanography,* 10(2):72–75, 1997.

Barrick, "Comment on 'Single station ocean current vector measurement: Application of the spaced antenna (SA) technique," *Geophys. Res. Letters,* 17:1637–1639, 1990.

(List continued on next page.)

*Primary Examiner*—John B. Sotomayor
(74) *Attorney, Agent, or Firm*—Fulbright & Jaworski LLP

(57) ABSTRACT

Systems and methods are described for synthesis of total surface current vector maps by fitting normal modes to radar data. A method includes extracting a scalar data set from a radar signal from a radar. Velocity components are calculated from the radar signal. The velocity components are fitted to a set of scalar eigenfunctions and eigenvalues to simultaneously solve for the best set of normal modes and the corresponding set of constants. The corresponding set of constants represent a corresponding set of amplitudes. The set of constants and the set of normal modes are used to create a two dimensional vector field used in creating a total vector map.

43 Claims, 6 Drawing Sheets

OTHER PUBLICATIONS

Barrick, "FM/CW radar signals and digital processing," *NOAA Tech. Report ERL 283–WPL 26*, 1973.

Barrick, et al., "Ocean surface currents mapped by radar," *Science*, 198:138–144, 1977.

Bjorkstadt and Roughgarden, "Larval transport and coastal upwelling: an application of HF radar in ecological research," *Oceanography*, 10(2):64–67, 1997.

Ereemev, et al., "Reconstruction of oceanic flow characteristics from quasi–Lagrangian data. 2. characteristics of the large–scale circulation in the black sea," *J. Geophys. Res.*, 97(C6):9743–9753, 1992.

Frisch and Leise, "A note on using continuity to extend HF radar surface current measurements," *J. Geophys. Res.*, 86:11089–11090, 1981.

Lipa and Barrick, "Extraction of sea state from HF radar sea echo: Mathematical theory and modeling," *Radio Sci.*, 21:81–100, 1986.

Lipa and Barrick, "Least–squares methods for the extraction of surface currents from CODAR crossed–loop data: Application at ARSLOE," *IEEE J. Oceanic Engr.*, OE–8:226–253, 1983.

Lipphardt et al., "Blending HF radar and model velocities in Monterey Bay through normal mode analysis," *J. Geophys. Res.*, 105(C2):3425–3450, 2000.

Zel'dovich et al., "On the representation of three–dimensional vector fields with scalar potentials (in Russian)," *Dokl. Akad. Nauk. SSSR*, 284(1):103–106, 1985.

* cited by examiner

SYNTHESIS OF TOTAL SURFACE CURRENT VECTOR MAPS BY FITTING NORMAL MODES TO SINGLE-SITE HF RADAR DATA

CROSS-REFERENCE(S) TO RELATED APPLICATION(S)

This application is also related to, and claims a benefit of priority under 35 U.S.C. 119(e) and/or 35 U.S.C. 120 from, copending provisional U.S. Serial No. 60/308,235 filed Jul. 26, 2001 and No. 60/315,567 filed Aug. 28, 2001.

BACKGROUND OF THE INVENTION

1. Field of the Invention

The invention relates generally to the field of surface flow. More particularly, the invention relates to total vector maps of surface flow. Specifically, a preferred implementation of the invention relates to using data from a single HF (high frequency) radar to construct total vector maps of surface flow.

2. Discussion of the Related Art

Coastal radars operating from MF through VHF are finding wide application for mapping the important surface flows that transport floating bodies, vessels, and pollutants. The Doppler shifts of echoes scattered from short-period surface gravity waves allow the measurement of one component of the two-dimensional surface velocity vector. For backscatter geometries where a transmitter and receiver are colocated, the measured component points toward or away from the radar, and is referred to as the radial velocity. When transmitter and receiver are separated, the radar geometry is known as bistatic. In this case, the component measured from the Doppler lies along hyperbolas confocal about the transmitter and receiver locations.

Conventional practice requires two or more such radars to observe a point on the ocean in order to construct a total velocity vector from each of the one-dimensional components measured by a single radar. Furthermore, the angle between the velocity components must avoid the near-parallel condition where the two are essentially the same; the best angle between them is a right angle. Finally, the point on the ocean at which the two-dimensional vector is desired must be viewable by both radars. That is, it cannot extend beyond the maximum range of either, nor can it be shadowed by land or coastal features. These conditions typically eliminate most of the radar data taken by one or the other radars. In the past, the only way to solve this problem has been to install additional radar units, driving up the cost and inconvenience of the observation system while demanding greater radio spectral bandwidth resources to accommodate more radiated signals.

Methods have been proposed and tested to construct total velocity vector current maps from single-site data. One used an equation of continuity approximation, based on the incompressibility of water. More recently, other approximations have been tried that involve time and space averaging of the radial vector data, sacrificing resolution in both of these variables and accuracy in the vector itself. Neither of these methods has proven sufficiently reliable for widespread acceptance and use.

U.S. Pat. No. 4,996,533, was issued in 1991 on a technique that purported to produce total vector maps from a single radar, obtaining the transverse velocity component with a spaced-antenna correlation method. Barrick (1990) proved that this method works only when flow direction is known with respect to the radar beam. Since this direction is unknown, that method provided nothing beyond the radial maps previously available, and its widespread commercialization never occurred. Many have observed that rigorous construction of total vectors from single-radar data only, in the manner of the above references, suffers from the inability of radial data fields to represent unambiguously circulation structures containing vorticity or curving flows, an essential feature of current circulation.

Recently Lipphardt et al. (2000) recognized that these methods could be applied to the total-vector two-dimensional current maps being produced by coastal HF radars on the open ocean. They began referring to the technique as "normal mode analysis" (NMA), and applied it to CODAR SeaSonde (CODAR Ocean Sensors; Los Altos, Calif.) measurements near Monterey Bay, Calif. As most users of HF surface-current data, they attacked the problem as follows: they employed the measurements only where total-vector data overlap from two or more radar sites. Thus, they eliminated data from perhaps 70% of the measurement area where only one radar could observe the sea. Their problem was compounded because most of their boundary was "open", meaning they had no shore to constrain the flow for normal mode computation. Therefore they had to rely on estimates of currents on the open, artificial boundary that were not independently measured.

As mentioned earlier, the problem with conventional methods that construct total vectors from single site radial data is that they have been hampered by the inability to resolve vorticity-containing rotational flow features.

Another problem with the current technology is the inability to obtain meaningful surface current maps in areas where inadequate or no data are available to form a direct two-dimensional vector from two scalar radar components at that point.

SUMMARY OF THE INVENTION

There is a need for the following embodiments. Of course, the invention is not limited to these embodiments.

An aspect of the invention is a method to synthesize total surface current vector maps. The method includes extracting a scalar data set from a radar signal from a radar. Radial velocity components are calculated from the radar signal. The radial velocity components are fitted in a linear least-squares manner to a set of scalar eigenfunctions and constants called normal modes. This set of normal modes are used to create a two-dimensional vector field or a current map.

These, and other, embodiments of the invention will be better appreciated and understood when considered in conjunction with the following description and the accompanying drawings.

BRIEF DESCRIPTION OF THE DRAWINGS

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION OF ILLUSTRATIVE EMBODIMENTS

Figure 1:
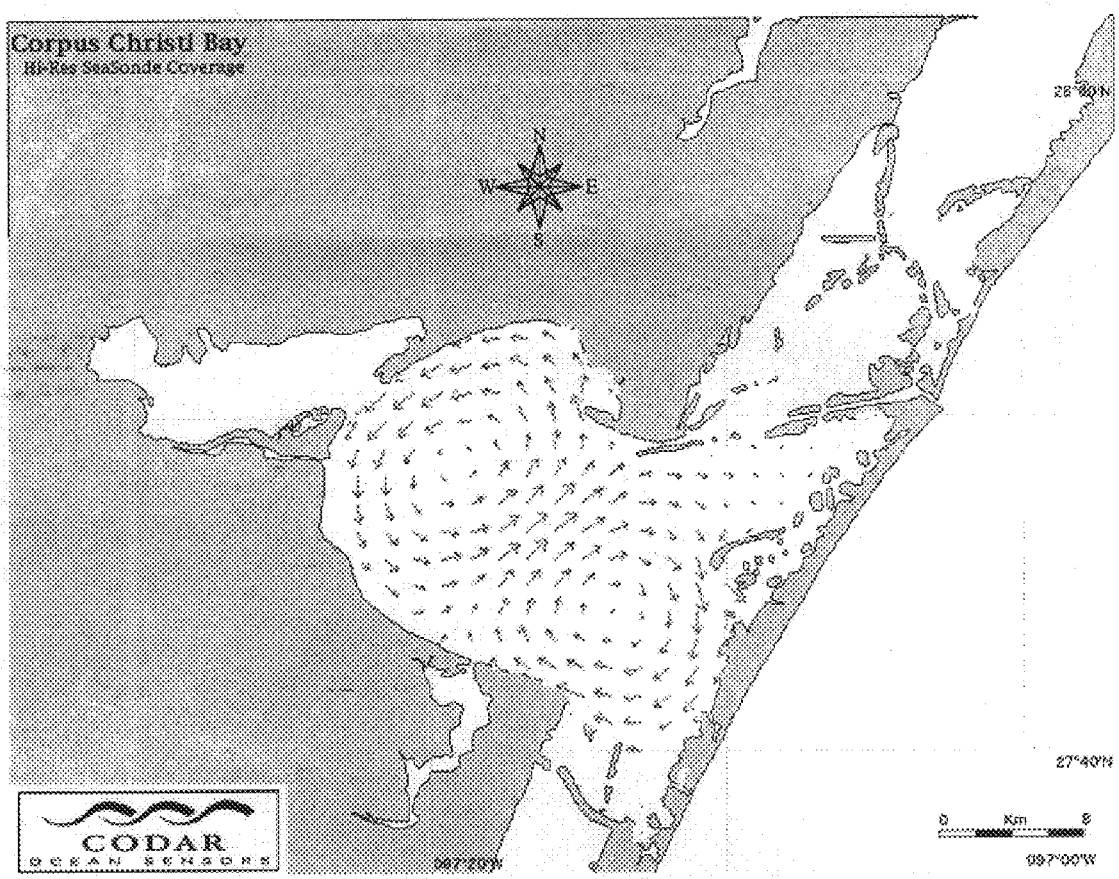
FIG. 1 illustrates a map of eddy and loop features known to exist in Corpus Christi Bay.

The invention and the various features and advantageous details thereof are explained more fully with reference to the nonlimiting embodiments that are illustrated in the accompanying drawings and detailed in the following description. Various substitutions, modifications, additions and/or rearrangements within the spirit and/or scope of the underlying inventive concept will become apparent to those skilled in the art from this disclosure.

The invention can include the ability to form meaningful two-dimensional surface-current vector maps when only one radar views the surface area.

The invention can also include a methodology to estimate flows in zones that are shadowed from direct radar observation by two or even one radar, as happens with complex coastlines inside of bays.

Oceanographers have developed methods to extract maximum information from sparsely sampled data. One such technique was derived to estimate current flow patterns from drifter buoy data. These buoy position samples in two-dimensional space are converted to velocity estimates by differencing the positions at coarse time intervals, e.g., every 8 hours. First, horizontal surface-current patterns called modes are derived that are determined entirely by the boundaries of the enclosing shoreline. The mode patterns satisfy hydrodynamic constraints that allow three-dimensional fields to be represented by potential functions over a two-dimensional surface. The lowest modes exhibit believable patterns as the enclosing coastal boundary constrains current directions so they flow parallel to shore rather than perpendicular. These modes are then fitted to the velocity tracks deduced from the drifter buoys. This method was applied successfully to drifter data for the Black Sea.

In some cases, normal mode methodology covered in this disclosure can be used even on the open seas with single radar observations. This is possible when the nature of the expected flow features is known. For example, in the Gulf of Mexico, eddies and loop currents are prevalent in certain areas, and single-site radial observations of these features are difficult to interpret when evaluated by themselves. However, when normal surface modes satisfying hydrodynamic constraints are considered that capture the nature of the features—eddies and loops—then one can construct very good depictions of the surface flow patterns.

The restrictions discussed earlier are circumvented in the present disclosure. Of importance is the use of one-dimensional vectors from a single radar. In bays and harbors, this discovery is especially meaningful because the jagged nature of the coastal contours occludes observation by two sites over most of the area, which only one or the other sites by themselves can see. This restriction occurs even for optimally sited radars. Furthermore, it opens up the possibility that a single radar by itself can provide meaningful two-dimensional current flows in bays and harbors, reducing the cost and complexity of networked systems that must be time-synchronized. On the open sea, it is accepted that a single radar is even less likely to provide meaningful total-vector surface circulation maps. However, this disclosure completely overturns that accepted operational assumption and constraint for bodies such as bays, estuaries, and harbors.

Figure 6:
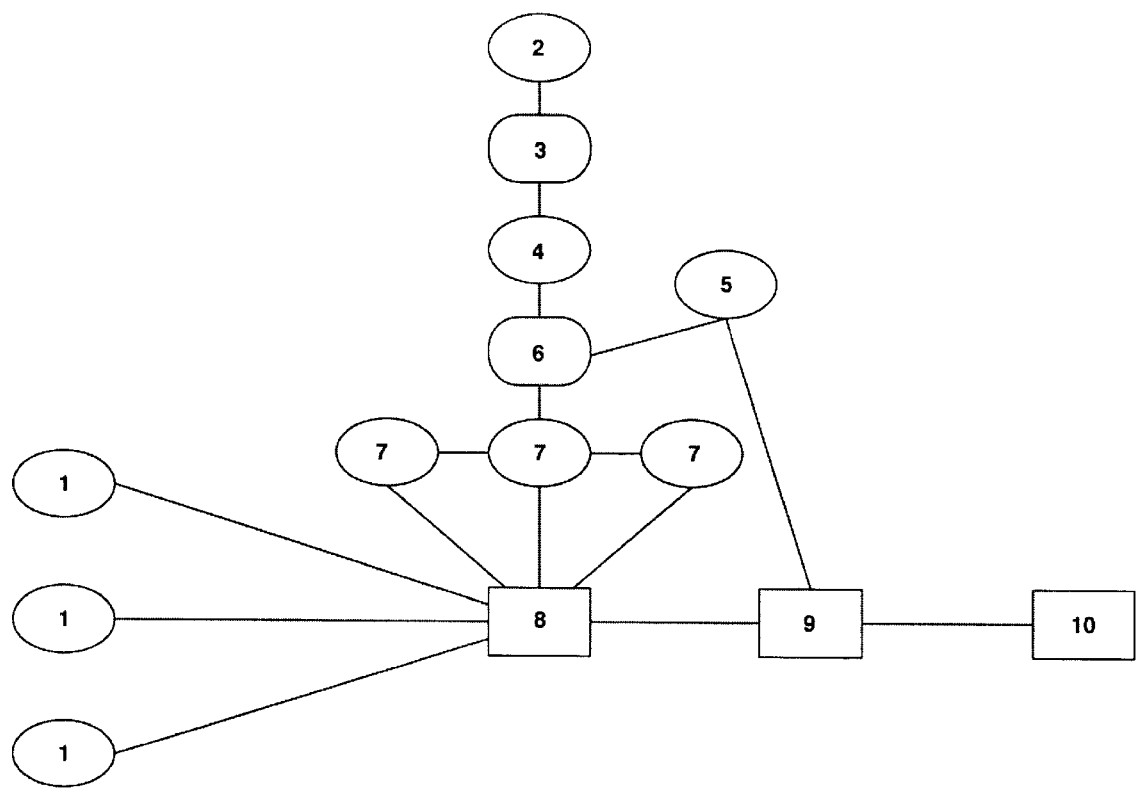
FIG. 6 illustrates a block diagram of an embodiment of the invention.

The invention will be explained in detail with reference to the accompanying system and processing block diagram, along with examples of current vector plots that illustrate the methodology. The block diagram in FIG. 6 shows the information flow and processing steps that reveal the essence of one embodiment of the present invention. Radial or hyperbolic maps of scalar surface speed components are input into the invention and processed, as shown to the left of the diagram 1; total vector map data are outputted at the right of the diagram 10. Oval-shaped blocks are databases, either from measurements or from maps. Blocks with rounded corners represent mathematical calculations done only once for a given location; these produce databases used during real-time or offline processing of time series of radar observations. Blocks with square corners depict computational steps that are executed each time a new set of radar observations becomes available. The figures showing actual vector maps are presented for understanding, so the concepts become clear based on application to real data.

The Mathematical Basis of Two-Dimensional Flow Modes

Flow on a two-dimensional surface (such as the air-sea interface) can be represented in terms of two scalar potential functions, even when the fluid below the surface is three-dimensional in nature. The fluid must be incompressible, which holds true for water. In this case, the velocity vector as a function of two-dimensional position, $\vec{x}$, is given by:

$$\vec{U}(\vec{x}) = \nabla \times [\hat{z}(-\Psi) + \nabla \times (\hat{z}\Phi)]$$

Here, $\Psi$ and $\Phi$ are scalar two-dimensional fields: the stream function and the velocity potential, respectively. The quantity $\hat{z}$ is a fixed unit vector pointing upward, normal to the sea surface.

In situations where the region under consideration is a nearly enclosed bay or harbor, the two scalar potential functions can be expressed in terms of modes whose patterns depend on the contour shape of the bounding coastline. These modes are solutions of the following second-order eigenfunction homogeneous partial differential equations:

$$\nabla^2 \Psi_n + \lambda_n \Psi_n = 0; \ \Psi_n = 0 \text{ at boundary}$$

and $$\nabla^2 \Phi_n + \mu_n \Phi_n = 0; \ \hat{n} \nabla \Phi_n = 0 \text{ at boundary}$$

where $\lambda_n$ and $\mu_n$ are the eigenvalues for the solutions to these equation sets; with $\Psi_n$, $\Phi_n$, being their respective eigenfunctions, and $\hat{n}$ is the unit vector normal to the coastal boundary. The stream function of the first equation satisfies the condition of no impedance to the flow tangent to the coastal boundary, and the velocity potential satisfies the condition that normal flow to the coast must be zero. Both of these conditions are valid over the time and space scales of interest for current mapping.

Once the eigenfunctions are known, the entire stream function and velocity potential can be expressed as compact series of N such eigenfunctions:

$$\Psi(\vec{x}) = \sum_{n=1}^{N_f} C_n \Psi_n(\vec{x}) \text{ and } \Phi(\vec{x}) = \sum_{n=1}^{N_d} D_n \Phi(\vec{x})$$

where $C_n$ and $D_n$ are unknown coefficients, to be determined by fitting to the radial velocity measurements from the HF radars.

The eigenfunctions and eigenvalues above can be found using any of the many finite-element software algorithms commercially available, where the bay coastline is used as the boundary contour in the algorithm. MATLAB (commercially available from MathWorks, Inc.; Natick, Mass.) has a "Partial Differential Equations" toolbox that can do this job. Once the eigenfunction modes $\Psi_n$, $\Phi_n$, have been computed for a given bay, plotting the velocities obtained for each of them using the first equation of this section may show patterns that appear to conform to the expected flows, as constrained by the coastal contours. This may be most clear for the lowest modes. For example, the velocity pattern for the second stream function mode, $\Psi_2$, is shown for Corpus Christi Bay in Texas as FIG. 1. This mode might typically be excited by a wind from the Southwest.

When one uses modes determined in this manner for bays, harbors, and estuaries, a huge advantage lies in the ability to represent circulation in terms of a small number of terms in the series, because they are the optimal descriptors of the hydrodynamic processes at play, as forced by the coastline. Normally, most of the current energy lies in the first few modes, and this is used as a criterion to decide how many of the energy data points to retain.

Use of Two-Dimensional Modes for Open Ocean Features

The method outlined above works well when the water surface area of interest is nearly entirely enclosed by a shoreline, such as bays, estuaries, and harbors. There appears to be fewer advantages offered when the boundary is open and thus artificial. In that case, the boundary conditions that may be present in the two sets of modes obtained in the eigenfunctions solution for the two scalar potentials mean little or nothing. Hence modes derived therefrom, based on an arbitrary open boundary, may not be better or worse than any other set of two-dimensional orthonormal basis functions in representing surface current fields.

There are cases where such modes may have merit such as when one knows of specific features that can be easily described by scalar potential modes of a certain type. After all, the scalar potentials and derived velocities may be representative of the hydrodynamic nature of water surfaces. The overall method may be exemplified by a case where potentials have proven useful in depicting eddy and loop features known to exist in the Northern Gulf of Mexico. Here, circularly based modes defined from the eigenfunctions in polar coordinates may be able to describe the looping characteristics of these features. These modes are comprised of classic Bessel and trigonometric functions. Estimates of their parameters such as radius and polar origin can be based on other information, and these estimates may be improved by the objective methods described later. The final fitted model outputs for total vector maps do not necessarily display the artificial circular features of individual polar modes because the summation of the lowest modes determined from the measured radial velocities may synthesize the more general natures of the evolving flows.

Figure 2:
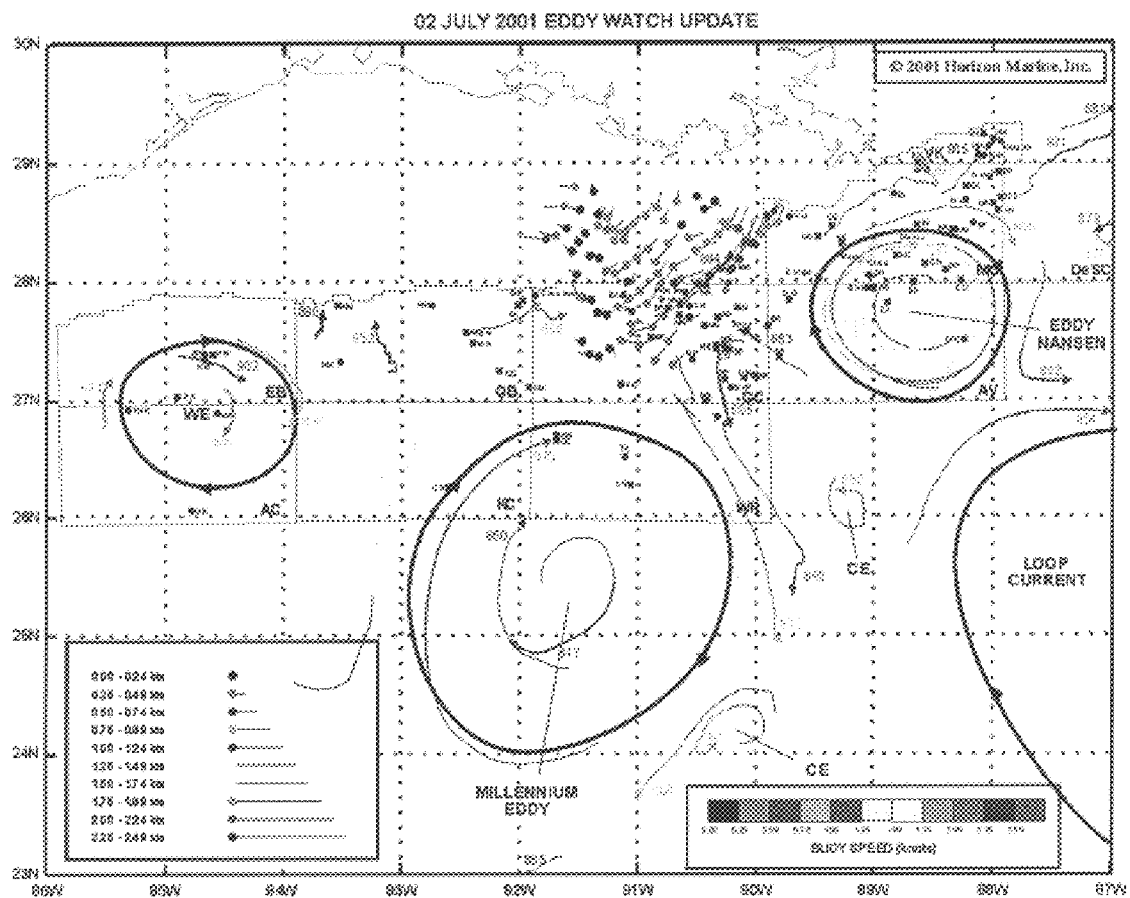
FIG. 2 illustrates a map of eddy and loop features for the Gulf of Mexico made from data obtained via prior art methods.

An example is shown for the Gulf of Mexico where two radars with ranges out to 300 km produce total vector maps in the conventional manner over the common area where the coverages overlap. In certain cases, however, the feature of interest is located too far from one radar to be seen, like Eddy Nansen whose approximate position was estimated in FIG. 2 by analyzing sparse drifting buoy data. In this case, only radial velocity data from the closer radar are available over the area where the eddy's existence is suspected. By fitting polar modes to the radial data from the closer radar site, in the manner discussed in the next sections, one obtains the map shown in FIG. 3, which clearly captures the circulation estimated at in the crude methods leading to FIG. 2.

Fitting Normal Modes to Capture Total Flow to Radial HF Radar Data

With regard to the above illustrative descriptions, the block diagram shown in FIG. 6 helps to explain the methodology behind one embodiment of the present disclosure. Shown to the left are radial data sets 1 from one or more radars at the same time, over a sea area of interest. For example, these may be created hourly as in the SeaSonde radar system, with final output total-vector maps generated "in real time", meaning shortly after the radial data sets have been gathered.

Assuming a bay or harbor application with enclosing shorelines, the coastline contour is stored mathematically as a database file in block 2. This is then used with a standard finite-element numerical algorithm (such as the MATLAB 'Partial Differential Equations Toolbox' available from MathWorks, Inc.; Natick, Mass.) in calculation 3 to produce the scalar eigenfunctions, $\Psi_n$ and $\Phi_n$, and eigenvalues, $\lambda_n$ and $\mu_n$, that may describe the stream function and velocity potential modes for this bay or estuary. These are stored as a database, 4, for subsequent use. An example of the velocity produced by the second stream function mode for the Corpus Christi Bay (Texas) shoreline, $\Psi_2$, was shown in FIG. 1.

Mode functions not obtained from enclosing coastlines of bays and harbors, such as the eddy on the open Gulf of Mexico, are precomputed and made available in the block 5 database. From these modal databases (computed either by applying finite difference methods to enclosed bays 4 or from guessing at the expected flow features 5), block 6 may compute another database 7 of radial velocity components for each of the normal modes. These depend on the location of the radar sites and upon the mathematical grid used for the measured radial data sets. Each of the grid points for the normal modes of 7 must match exactly the grid used for the measurements. Thus, for bays and estuaries, computations 3 and 5 need be done only once.

Where measured data are obtained at each of these grid points in 1, these are matched to the corresponding radial velocity measurements 7 for $N_f$ and $N_d$ normal modes in a linear least squares fitting process 8. The unknown parameters to be recovered simultaneously in this straightforward linear least-squares solution are the mode constants $C_n$ and $D_n$. If the radial measurement errors or uncertainties are known, the least-squares terms can be divided (normalized) by these values to increase the fitting accuracy, in an extension known as maximum likelihood. In the linear least-squares solutions, there are many more data points than there are unknowns, so this system of equations is referred to as overdetermined. Where the radial data sets from more than one site 1 may overlap and total vectors could have been produced directly, it is still more robust and accurate to employ the radial velocities rather than the total vectors in the mode fitting process.

Next, one examines and optimizes the parameters, in step 9. For example, after one has found a solution for the $N_f+N_d$ modes, one decides whether more (or fewer) modes were needed. By examining the kinetic energy in the velocity flows for each mode, i.e., the sum of the squares of the vectors for that mode at all grid points, one has a physical basis for deciding when higher modes contain so little energy relative to the others that they can be ignored and the series can be truncated.

Figure 3:
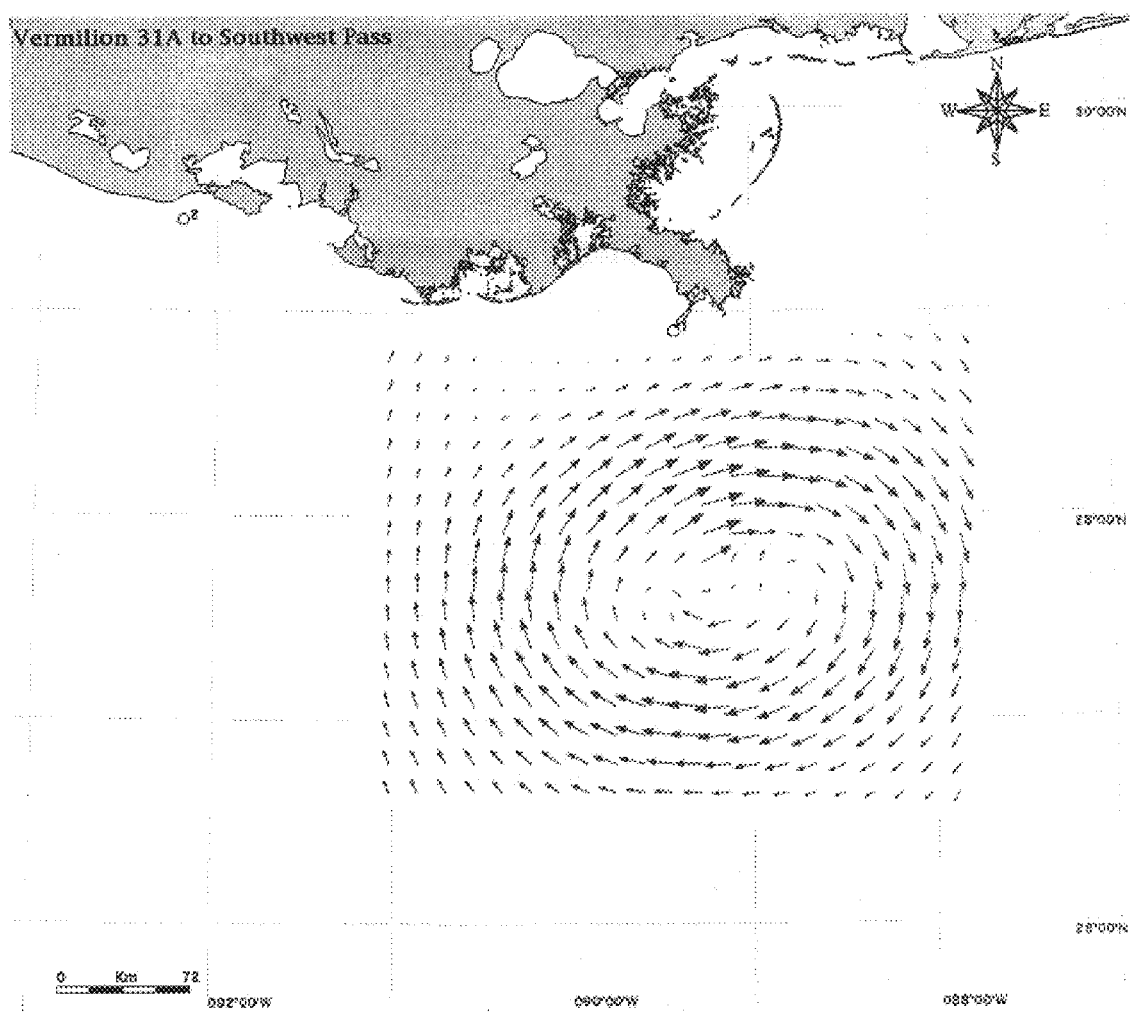
FIG. 3 illustrates a map of eddy and loop features for the Gulf of Mexico made from data obtained via a method that is an embodiment of the present disclosure.
Figure 4:
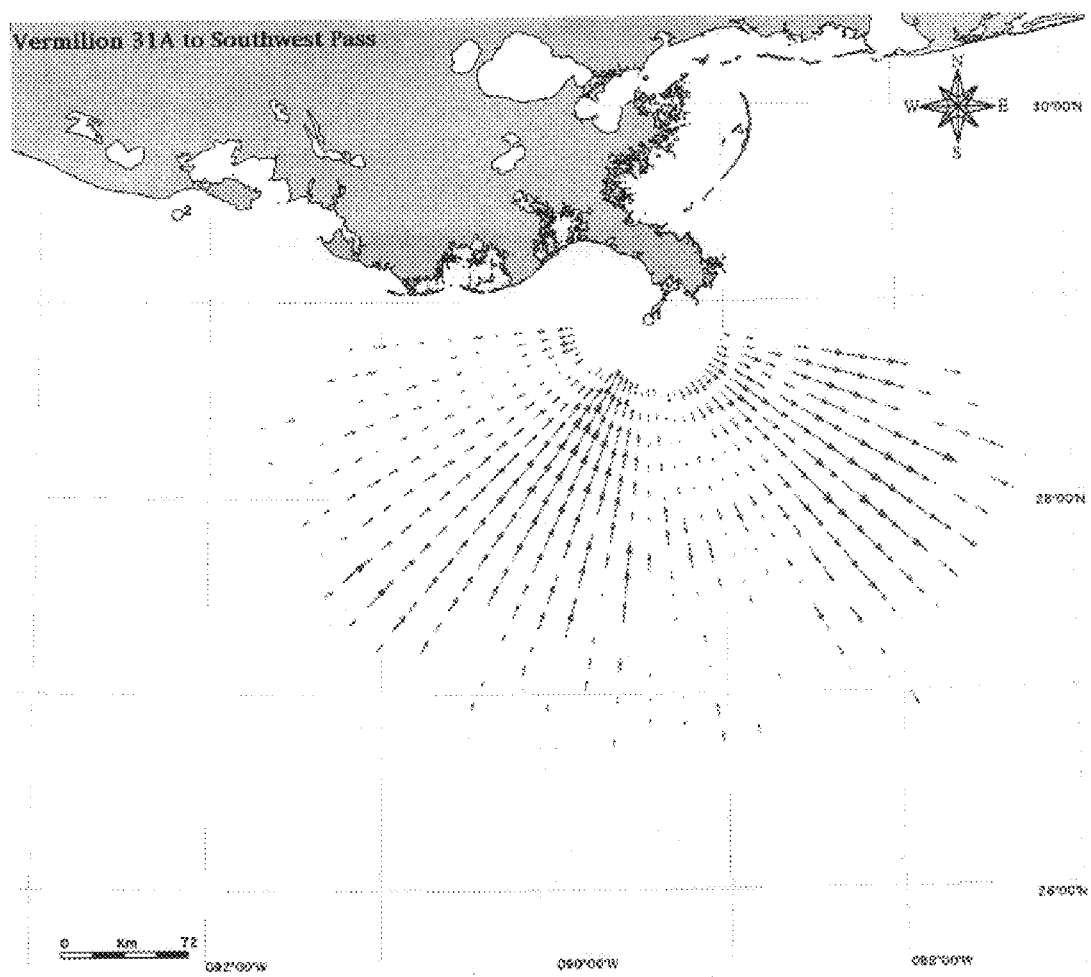
FIG. 4 illustrates single-site radar eddy measurements in the Gulf of Mexico, obtained via a method that is an embodiment of the present invention.
Figure 5:
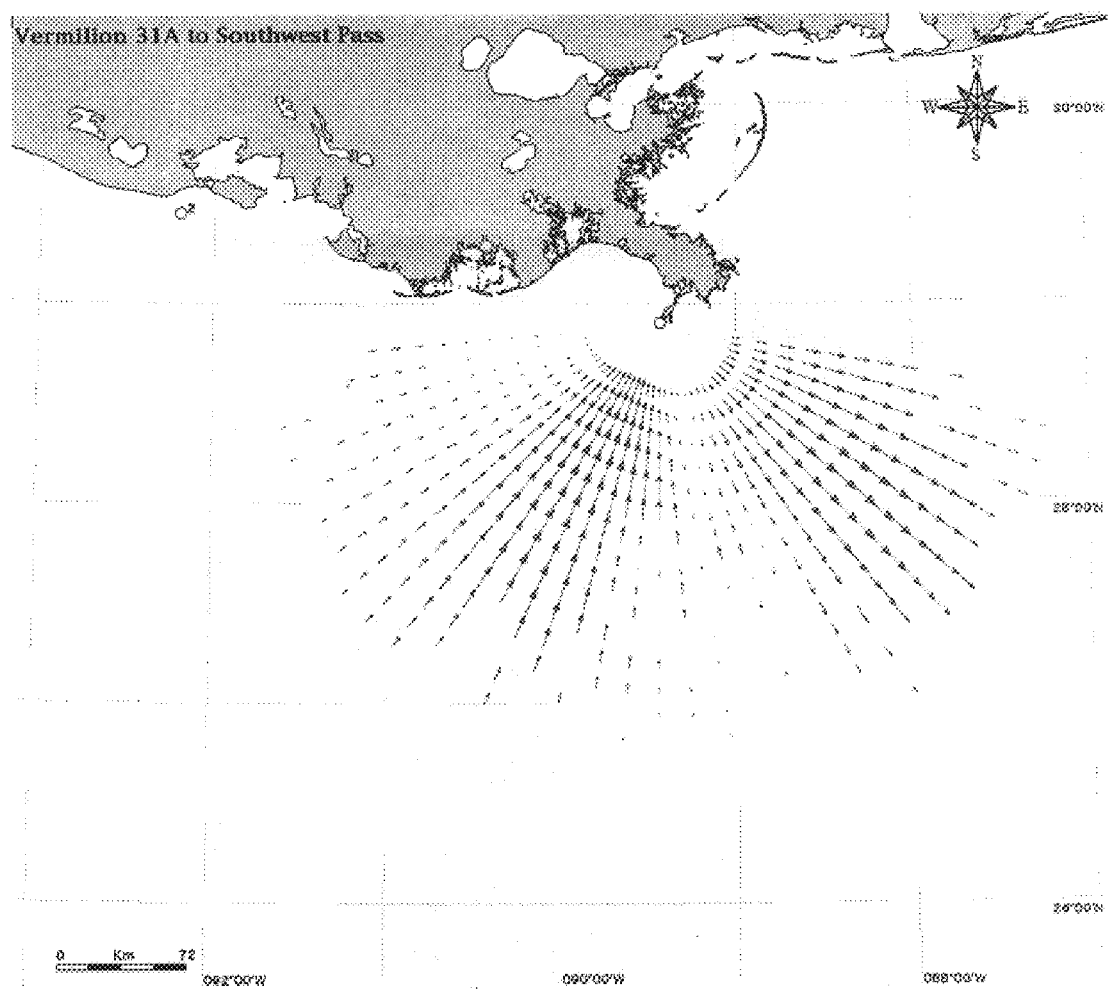
FIG. 5 illustrates a radial velocity map of the Gulf of Mexico, made in accordance with embodiments of the present disclosure.

Another objective process that can be included in the optimization of step 9 is residual calculation. In this method, the summed radial patterns for the $N_f+N_d$ modes are subtracted from the input measured radial patterns 1 at each grid point. The result is squared and summed over all the grid points and radar sites used. As an example, the measured radial velocity map for the single-site radar eddy measurements in the Gulf of Mexico whose results were shown in FIG. 3, are displayed here in FIG. 4. The fitted model's radial velocity map at these same points is shown in FIG. 5. As one can see, the modes that were used capture most of the essential features seen in the input measured data. If the fittings were perfect, this residual sum should be zero. By comparing it with the root-mean-square measured radial data themselves, this residual comparison shows the effectiveness of the process. For the Gulf of Mexico example highlighted here, the residual error between the maps of FIG. 4 and FIG. 5 is 9.7 cm/s, while the rms value of the measured velocity in the radial map of FIG. 3 is 23 cm/s. Eight modes were used in this case: seven stream function modes and one velocity potential mode. These capture 98% of the energy, so adding more modes to the calculations accomplishes little.

This residual comparison process may suggest that more modes may be necessary in a given analysis. On the other hand, it may suggest that the parameters of the modes themselves, as when the open-boundary database 5 was estimated, may not be optimized. In this case, the modes 5 can be recalculated and the subsequent steps repeated to see whether the residual fitting error has improved or not. When a minimum residual error is achieved, the iteration process may be halted. Or, a high residual error compared to the RMS current may be a signal to abandon the methods here entirely. In any case, the final residual is a measure of error in the overall process described in this invention.

Finally, when the best, optimized set of parameters $C_n$ and $D_n$ are obtained, the series are summed and total velocity maps are computed and can be displayed, as was done in FIG. 3. This computation is represented as step 10. To do this, the modes represented by the series $$\Psi(\vec{x}) = \sum_{n=1}^{N_f} C_n \Psi_n(\vec{x}) \text{ and } \Phi(\vec{x}) = \sum_{n=1}^{N_d} D_n \Phi(\vec{x})$$

are substituted into the equation defining the total horizontal surface velocity field:

$$\vec{U}(\vec{x}) = \nabla \times [\hat{z}(-\Psi) + \nabla \times (\hat{z}\Phi)]$$

Note that this field of vectors may be defined everywhere in the area where the modes exist, not just where the measurements were made. Thus, gaps may be filled in, multiple overlap regions can be fitted in the best possible manner, and smoothing or filtering of noisy measurements can be done in a manner consistent with the expected hydrodynamic behavior of the retained modal patterns.

In addition, step 10 may compute other important fields that are difficult to extract from directly measured total vector maps. These include vorticity and divergence. The latter represents regions of upwelling, which are very important oceanographically, as they are nutrient-rich feeding grounds for fish. Calculating these fields conventionally from measured data involves differencing data at adjacent grid points. If these data values have even small amounts of noise, their differences may enhance the noise so that accurate vorticity and divergence fields are difficult if not impossible much of the time. Because these fields are inherently embodied in the normal mode series, no such differentiation is needed. In fact, the fields for vorticity and divergence are calculated from the following equations:

$$\omega = -\sum_{n=1}^{N_f} \lambda_n C_n \Psi(\vec{x}) \text{ and } \delta = -\sum_{n=1}^{N_d} \mu_n D_n \Phi(\vec{x})$$

All of these fields can be displayed graphically or archived in any manner convenient to the user.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program or phrase computer program, as used herein, is defined as a sequence of instructions designed for execution on a computer system.

Practical Applications of the Invention

A practical application of the invention that has value within the technological arts is the construction of total vector maps of surface flows from HF radar data taken by a single radar site. An embodiment of the invention is especially suited to bays, estuaries, and harbors.

Advantages of the Invention

Accordingly, advantages of the present invention center on the effective use of information from single radars that has to now been considered inadequate for producing total vector current maps. This means fewer radars can do the same job as many, reducing cost, system complexity, and radio spectral occupancy. Or, the same number of radars can cover a much broader area than before. The robustness, resolution, accuracy, and area coverage of desired information is enhanced.

An embodiment of the invention presents an advantage in that it provides hydrodynamics-based technique that can allow three-dimensional fluid flows to be described two-dimensionally, such as on the surface of the sea. It introduces a finite-element method that can solve for normal surface modes optimally suited to characterizing flows in enclosed areas such as bays, estuaries, and harbors. Yet another embodiment of the invention may demonstrate an advantage in a robust, least-squares method for fitting normal mode patterns to multiple backscatter and bistatic current measurements at the same point, but done at the radial level (for backscatter) or hyperbolic level (for bistatic), rather than after total vector formation.

Another advantage of an embodiment of the invention may be an objective process to arrive at a small but oceanographically meaningful number of two-dimensional normal surface modes that will characterize location-specific flow features where temporal and spatial data gaps appear frequently. Another advantage of an embodiment of the invention may be the ability to filter errors from current data in a manner that is hydrodynamically based.

All the disclosed embodiments of the invention disclosed herein can be made and used without undue experimentation in light of the disclosure. The invention is not limited by theoretical statements recited herein.

What is claimed is:

1. A method of constructing a two-dimensional vector field comprising:

extracting a scalar data set from a radar signal;

computing a set of velocity components corresponding to the radar signal;

matching the set of velocity components with a set of scalar eigenfunctions using a linear least squares fitting process to simultaneously find a mode constant set $C_n$ and mode constant set $D_n$, each comprised of $N_f$ and $N_d$ constant values, respectively; and creating the two-dimensional vector field from the summation of the mode constant set $C_n$ and the summation of the mode constant set $D_n$.

2. The method of claim 1, wherein the radar signal is propagated over a sea area with enclosing shorelines.

3. The method of claim 2, wherein a coastline contour is stored mathematically as a database file.

4. The method of claim 3, wherein the coastline contour is used to calculate a set of eigenfunctions and a set of eigenvalues.

5. The method of claim 4, wherein the set of eigenfunctions and the set of eigenvalues describe modes for the sea area.

6. The method of claim 4, further comprising storing the set of eigenfunctions and the set of eigenvalues as a database.

7. The method of claim 1, wherein the radar signal is propagated over a sea area without enclosing shorelines.

8. The method of claim 7, wherein a set of eigenfunctions and a set of eigenvalues that describe modes for the sea area without enclosing shorelines are pre-calculated.

9. The method of claim 8, further comprising storing the set of eigenfunctions and the set of eignvalues in a database.

10. The method of claim 1, further comprising storing the set of velocity components in a database.

11. The method of claim 1, wherein the set of velocity components includes velocity components selected from the group consisting of radial velocity components and hyperbolic velocity components.

12. The method of claim 1, wherein the mode constant set $C_n$ and the mode constant set $D_n$ are optimized.

13. The method of claim 12, wherein the mode constants are optimized by:

calculating a solution for a set of $N_f+N_d$ modes, examining a kinetic energy for each mode; and determining if higher modes can be eliminated from consideration based on the kinetic energy.

14. The method of claim 12, further comprising performing a residual calculation.

15. The method of claim 14, wherein performing the residual calculation comprises:

determining a set of patterns for $N_f+N_d$ modes;

subtracting the set of patterns from the scalar data set to obtain a set of results; and squaring and summing the set of results.

16. The method of claim 15, wherein the set of patterns includes at least one pattern selected from the group consisting of radial patterns and hyperbolic patterns.

17. The method of claim 13, further comprising optimizing the mode constant set $C_n$ and the mode constant set $D_n$ if higher modes cannot be eliminated.

18. The method of claim 1, further comprising creating a total vector map from the two-dimensional vector field.

19. The method of claim 18, wherein the field of vectors are defined in gaps in the scalar data set.

20. The method of claim 1, further comprising filtering the plurality of radar signals based on hydrodynamic behavior.

21. The method of claim 1, further comprising computing vorticity fields or divergence fields.

22. An apparatus to perform the method of claim 1.

23. A method of constructing a map of two dimensional vector fields, comprising:

extracting a plurality of scalar data sets from a plurality of radar signals from a plurality of radar stations;

computing a plurality of sets of velocity components corresponding to the plurality of radar signals;

matching the plurality of sets of velocity components with a plurality of sets of scalar eigenfunctions using a linear least squares fitting process to simultaneously find a plurality of mode constant sets $C_n$ and a plurality of mode constant sets $D_n$, each comprised of a plurality of normal mode sets $N_f$ and a plurality of normal mode sets $N_d$, respectively;

creating a two-dimensional vector field from a summation of the plurality of mode constant sets $C_n$ and a summation of the plurality of mode constant sets $D_n$; and creating a total vector map from the vector field.

24. The method of claim 23, wherein the plurality of sets of velocity components are sets of radial components when backscatter radar geometries are used.

25. The method of claim 23, wherein the plurality of sets of velocity components are sets of hyperbolic components when bistatic radar geometries are used.

26. The method of claim 23, wherein the plurality of radar signals are propagated over a sea area with enclosing shorelines.

27. The method of claim 26, wherein a coastline contour is stored mathematically as a database file.

28. The method of claim 27, wherein the coastline contour is used to calculated a set of eigenfunctions and a set of eigenvalues.

29. The method of claim 28, wherein the set of eigenfunctions and the set of eigenvalues describe modes for the sea area.

30. The method of claim 28, further comprising storing the set of eigenfunctions and the set of eigenvalues as a database.

31. The method of claim 23, wherein the radar signal is propagated over a sea area without enclosing shorelines.

32. The method of claim 31, wherein a set of eigenfunctions and a set of eigenvalues that describe modes for the sea area are pre-calculated.

33. The method of claim 23, further comprising storing the plurality of sets of velocity components in a database.

34. The method of claim 23, wherein the plurality of mode constant sets $C_n$ and the plurality of mode constant sets $D_n$ are optimized.

35. The method of claim 34, wherein the mode constants are optimized by:

calculating a solution for a set of $N_f+N_d$ modes, examining a kinetic energy for each mode; and determining if higher modes can be eliminated from consideration based on the kinetic energy.

36. The method of claim 34, further comprising performing a residual calculation.

37. The method of claim 36, wherein performing the residual calculation comprises:

determining a set of patterns for $N_f+N_d$ modes;

subtracting the set of patterns from the scalar data set to obtain a set of results; and squaring and summing the set of results.

38. The method of claim 37, wherein the set of patterns includes at least one pattern selected from the group consisting of radial patterns and hyperbolic patterns.

39. The method of claim 35, further comprising optimizing the plurality of mode constant sets $C_n$ and the plurality of mode constant sets $D_n$ if higher modes cannot be eliminated.

40. The method of claim 23, wherein the two-dimensional vector field is defined in gaps in the scalar data set.

41. The method of claim 23, further comprising filtering the plurality of radar signals based on hydrodynamic behavior.

42. The method of claim 23, further comprising computing vorticity fields or divergence fields.

43. The method of claim 23, wherein multiple radial data sets from the plurality of radial data sets mutually overlap.

* * * * *

UNITED STATES PATENT AND TRADEMARK OFFICE
CERTIFICATE OF CORRECTION

PATENT NO. : 6,590,523 B2
DATED : July 8, 2003
INVENTOR(S) : Barrick, D.

It is certified that error appears in the above-identified patent and that said Letters Patent is hereby corrected as shown below:

Column 9,
Line 50, delete "," and insert -- ; -- therefor.

Column 10,
Line 40, delete "calculated" and insert -- calculate -- therefor.
Line 60, delete "," and insert -- ; -- therefor.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

| | |
|---|---|
| PATENT NO. | : 6,590,523 B2 |
| APPLICATION NO. | : 10/113881 |
| DATED | : July 8, 2003 |
| INVENTOR(S) | : Donald E. Barrick |

It is certified that error appears in the above-identified patent and that said Letters Patent is hereby corrected as shown below:

On the Title Page:

Add the following information Item (60):

--Related U.S. Application Data

(60) Provisional application No. 60/327,217, filed on October 4, 2001, and provisional application No: 60/315,567, filed on August 28, 2001, and provisional application No: 60/308,235, filed on July 26, 2001.--

Signed and Sealed this

Eighteenth Day of May, 2010

David J. Kappos
*Director of the United States Patent and Trademark Office*